Feb. 1, 1955 J. M. CHAMBERS ET AL 2,701,072
CANTILEVER FRONT END LOADER FOR TRACTORS
Filed March 7, 1951 5 Sheets-Sheet 3
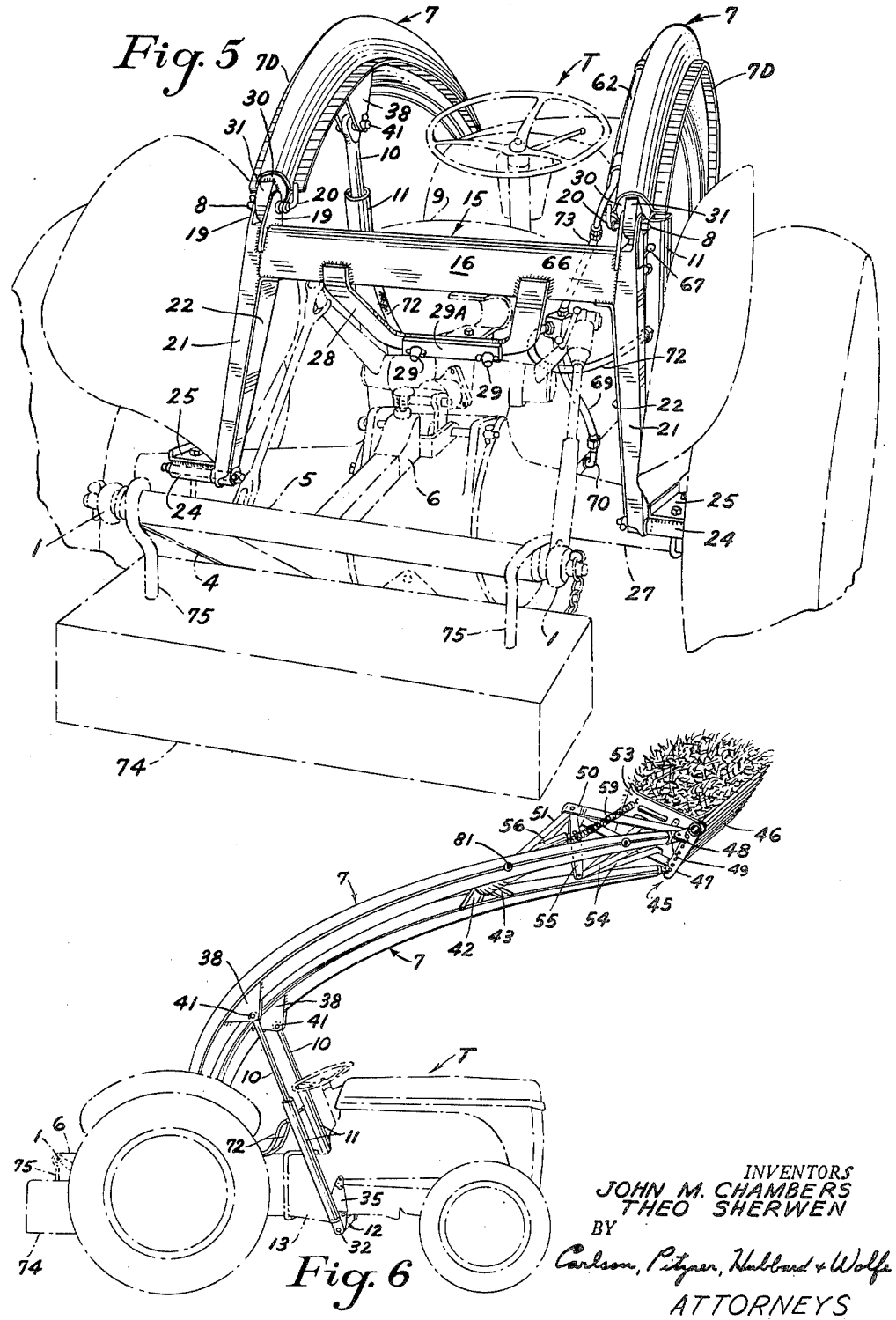
INVENTORS
JOHN M. CHAMBERS
THEO SHERWEN
BY
Carlson, Pitzner, Hubbard & Wolfe
ATTORNEYS

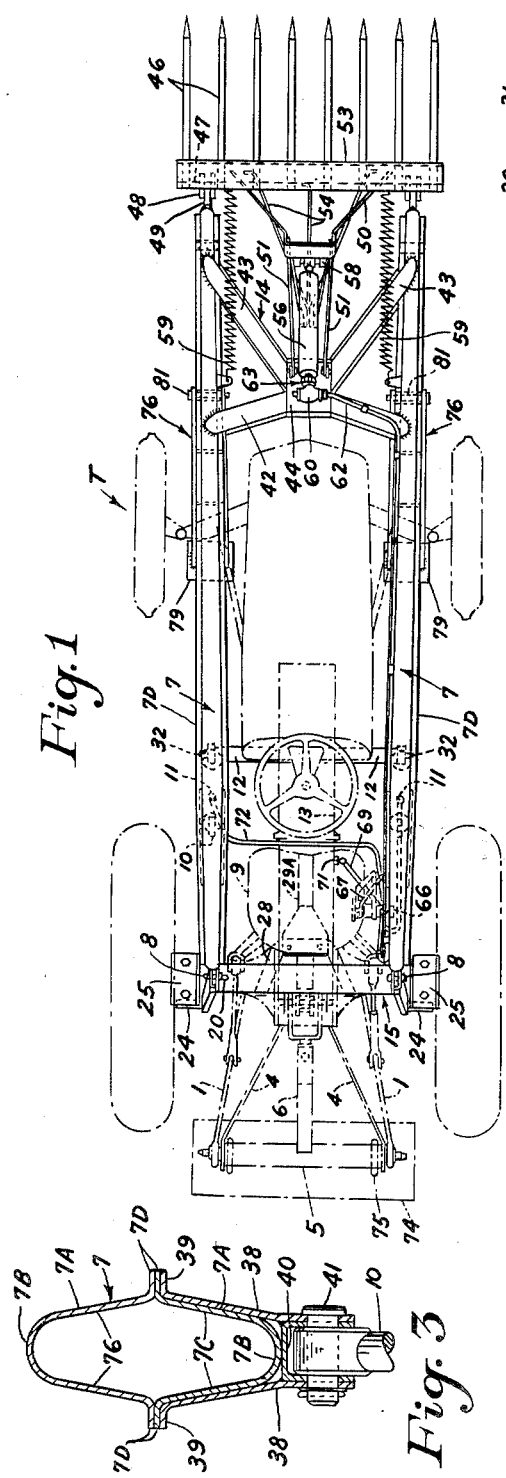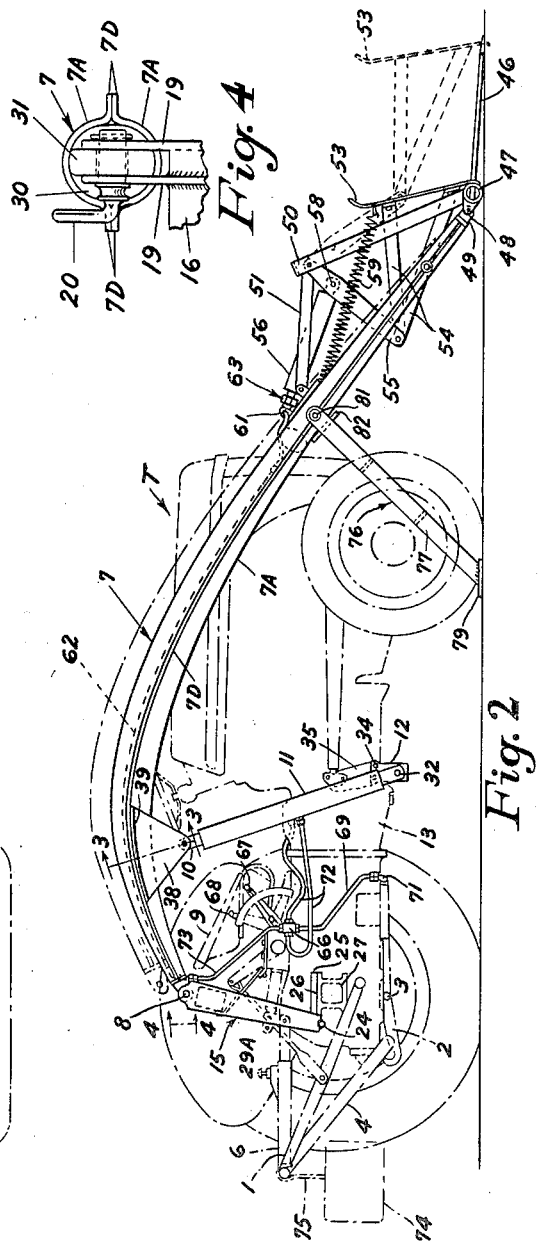
Feb. 1, 1955 J. M. CHAMBERS ET AL 2,701,072
CANTILEVER FRONT END LOADER FOR TRACTORS
Filed March 7, 1951 5 Sheets-Sheet 1
INVENTORS
JOHN M. CHAMBERS
THEO SHERWEN
BY
Carlson, Pitzner, Hubbard & Wolfe
ATTORNEYS

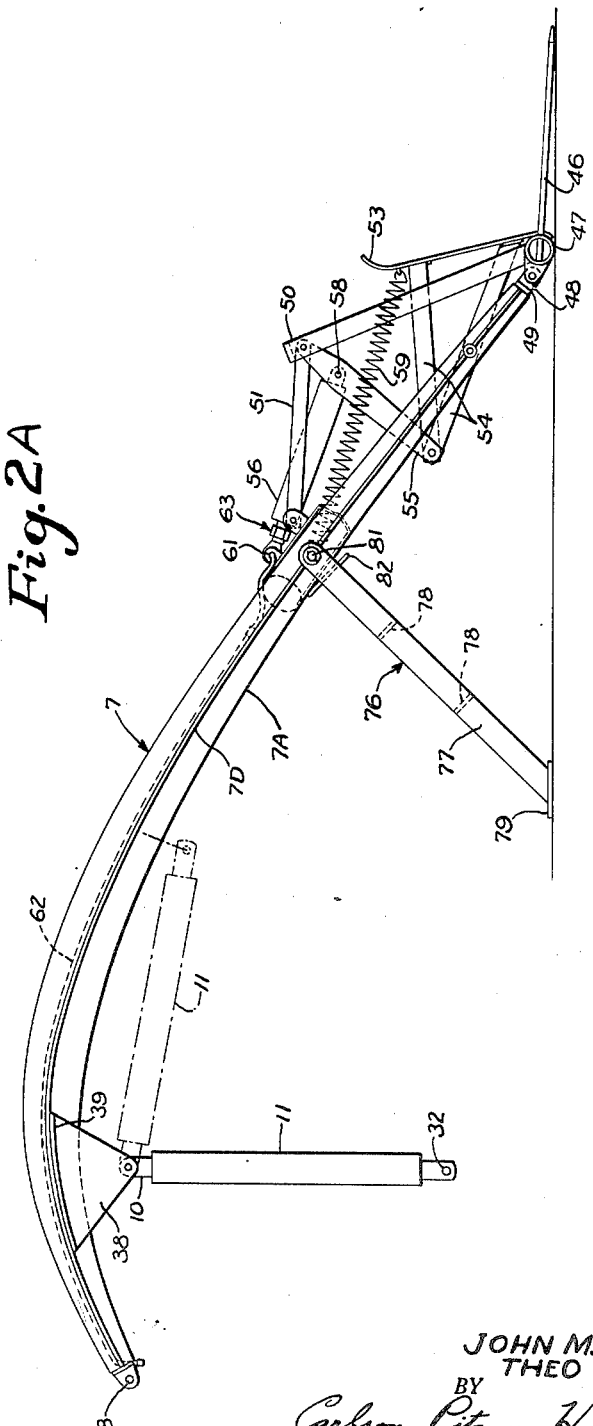

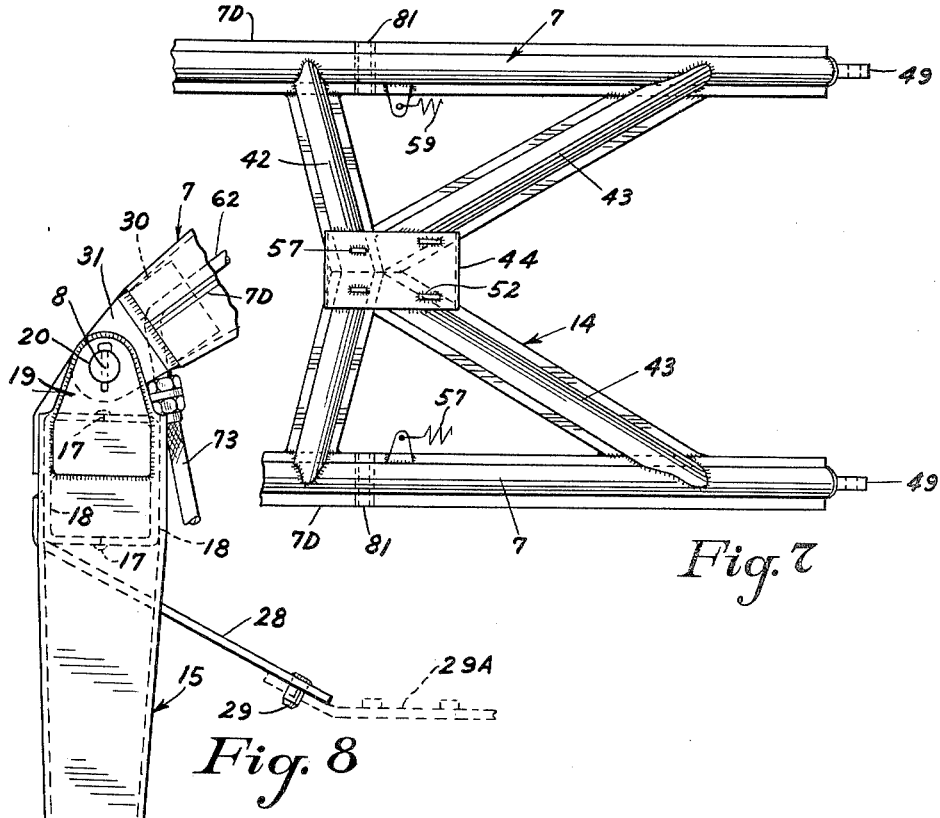

Feb. 1, 1955   J. M. CHAMBERS ET AL   2,701,072
CANTILEVER FRONT END LOADER FOR TRACTORS
Filed March 7, 1951   5 Sheets-Sheet 5

INVENTORS
JOHN M. CHAMBERS
THEO SHERWEN
BY
Carlson, Pitzner, Hubbard & Wolfe
ATTORNEYS

United States Patent Office 2,701,072
Patented Feb. 1, 1955

2,701,072

CANTILEVER FRONT END LOADER FOR TRACTORS

John M. Chambers, Leamington Spa, and Theo Sherwen, Norton Lindsey, England, assignors to Massey-Harris-Ferguson (Sales) Limited, a British company Application March 7, 1951, Serial No. 214,254

Claims priority, application Great Britain March 9, 1950

9 Claims. (Cl. 214—510)

The present invention relates in general to load lifter attachments adapted for mounting on tractors. More particularly, the invention is concerned with a cantilever front end loader susceptible of use with a tractor having a hydraulic power lift. It has special, but by no means exclusive, utility when mounted on the well-known "Ferguson" tractor which has a hydraulic power lift such as that disclosed in Henry George Ferguson Patent No. 2,118,180, issued May 24, 1938.

The invention also has special, but not exclusive, utility as applied to a tractor having an automatic hitch connection of the character set forth in copending application Serial No. 63,404 of Theo Sherwen, filed December 3, 1948.

One object of the invention is to provide a novel front end loader attachment having a "clean," lightweight structural arrangement composed of a minimum number of members but possessing great strength and ruggedness.

Another object is to provide a load lifter attachment of the foregoing type and capable of actuation by auxiliaries operated from the built-in hydraulic system of the tractor, being adapted to raise and lower a load with a minimum amount of translational movement in a fore and aft direction.

A further object is to provide a load lifter attachment of the character set forth and which can be coupled to and uncoupled from the tractor with speed and facility, requiring no unusual effort or dexterity on the part of the driver.

Still another object is to accomplish the foregoing by means of an attachment that can be manufactured economically on a mass productive basis, largely from pressed or stamped sheet metal parts.

Further objects and advantages of the invention will become apparent as the following description proceeds, taken in connection with the accompanying drawings, in which:

Figure 1 is a plan view of an illustrative load lifter attachment embodying the present invention, the attachment being located in operative position on the tractor shown in dot-dash outline.

Fig. 2 is a side elevation of the attachment and tractor shown in Fig. 1.

Fig. 2A is an enlarged side elevation of the attachment as shown in Fig. 2 but with the tractor and associated mounting members omitted.

Fig. 3 is an enlarged fragmentary transverse sectional view through a portion of the attachment, taken in the plane of the line 3—3 in Fig. 2.

Fig. 4 is an enlarged fragmentary elevational view taken in the plane of the line 4—4 in Fig. 2 and detailing one of the pivotal connections of the illustrative attachment.

Fig. 5 is an enlarged perspective view illustrating the arrangement utilized for mounting the attachment at the rear of the tractor.

Fig. 6 is a perspective view showing the tractor with the attachment in raised position.

Fig. 7 is an enlarged fragmentary plan view detailing a portion of the beam and connecting frame structure.

Fig. 8 is an enlarged fragmentary side elevation showing the upstanding fulcrum bridge of the attachment and which is mountable on the rear of the tractor.

Fig. 9 is an enlarged fragmentary plan view detailing the push-off ram and its connections, certain parts being broken away and shown in cross section.

Figure 12:
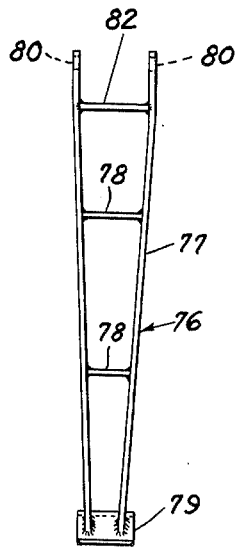
Figs. 12 and 13 are front and side elevational views, respectively, of a stand for the load lifter attachment.

Referring more particularly to the drawings, the invention has been exemplified therein as embodied in a load lifter attachment specially designed for use on the present commercial form of "Ferguson" tractor. It will be appreciated by those skilled in the art, however, that various substitutions or changes in parts, or alternative or modified arrangements may be used, particularly in accommodating the load lifter attachment to other specific forms of tractors. There is, therefore, no intention to limit the invention to the precise embodiment illustrated herein. On the other hand, the intention is to cover all alternative or equivalent constructions falling within the spirit and scope of the invention as expressed in the appended claims.

The general construction and operation of the illustrated tractor T, including its hydraulic power lift, will be familiar to those skilled in the art, and for further details reference might also be made to Ferguson Patent No. 2,118,180, mentioned above. For present purposes, however, it will suffice to note that the tractor has a pair of trailing hitch links 1 disposed in forwardly converging, side-by-side relation, being pivoted on the rear end housing below and slightly forward of the rear axle (see Figs. 1, 2 and 5). The links 1 are adapted to be raised and lowered in unison by the hydraulic power lift.

The tractor T is also equipped with a hitch of the type disclosed in copending application Serial No. 63,404, mentioned earlier herein. Briefly, such hitch comprises a hook 2 pivoted to the underside of the tractor as at 3 and adapted to be raised and lowered by means of links 4 attached by a cross bar 5 to the trailing ends of the hitch links 1. Extending from the cross bar 5 to the rear of the tractor is a latchable telescopic strut 6, the function of the latter in this instance being to arrest the movement of the hitch links 1 shortly before they reach their uppermost position wherein the supply of pressure fluid to the hydraulic unit would be cut off. The aim of preventing such cutoff is to leave a supply of pressure fluid available for use in the auxiliary hydraulic rams which operate the load lifter attachment.

Turning now to the front end loader attachment per se, it will be perceived upon reference to Figs. 1 and 2 that the same comprises an arched boom structure defined in this instance by a pair of laterally spaced beams 7 disposed in fore and aft relation with the tractor T and straddling the same. The beams 7 are of arched or drooping shape, when viewed in side elevation, and are pivoted respectively at spaced apart fulcrum points 8 disposed in transverse alinement in a relatively high location at the rear of the tractor behind the driver's seat 9. From the points 8, which are located on suitable connection means, the beams 7 extend forwardly and project beyond the front of the tractor, their forward end portions having a suitable load receptacle fixed thereto. Each of the beams 7 has an intermediate portion with means pivotally connected to the respective movable members 10 of generally upright hydraulic ram devices 11. The lower ends of the latter are pivotally connected to the respective lateral extremities of a transverse fulcrum bar 12 mountable in closely nested relation below the tractor housing 13. To provide strength and rigidity at the forward end of the loader attachment, the forward end portions of the beams 7 are rigidly interconnected by a frame 14 which happens in this case to be of generally cruciform shape.

For the purpose of effecting approximately uniform stressing longitudinally of the beams 7, the intermediate portion of each is formed with a cross section of relatively great depth in the vicinity of the ram connecting means, tapering in either direction toward end portions with cross sections of substantially lesser depth. In furtherance of such objective, and also in the interest of accomplishing it while effecting savings in weight and other economies contributing to low manufacturing cost, the beams 7 are fashioned in hollow tubular form. Accordingly, in the illustrative loader attachment, each of the beams 7 comprises complementary upper and lower metal pressings or stampings 7A of generally U-shaped cross section. Such cross section includes an arcuate portion 7B terminating in straight but outwardly diverging side wall portions 7C and outturned flanges 7D. The complementary stampings 7A of each beam may easily be assembled with their flanges 7D in abutment and spot welded or otherwise rigidly joined together. This produces a joint extending substantially along the neutral axis of the beam and which is largely free of the beam stresses. The flanges 7D may, of course, be reduced in size or eliminated completely, in which event the complementary stampings 7A might be secured together by means of a continuous butt weld. The radius of curvature of the arcuate portion 7B of each stamping may remain constant throughout the length of the beam, the depth of the straight side wall portions 7C decreasing toward the ends of each beam to provide the longitudinal taper from the region of attachment of the actuating ram 11 toward either end of the beam (see Figs. 2, 3, 4 and 6). The arcuate portion 7B may, on the other hand, have a radius of curvature which varies longitudinally of the beam.

Preferably, each beam half 7A is formed from a suitably shaped flat plate which is first simply bent to give the droop or longitudinal curvature and is then cold pressed to give the cross-sectional shape illustrated in the drawings. At the same time, the strength of the metal is enhanced by the cold working incident to the stamping operation. The relatively large radius of curvature of the arcuate portion 7B and the attainment of depth variation in the beam by varying only the depth of the straight side walls 7C permit the use of stamping dies of reasonable simplicity of shape.

In the exemplary attachment described herein, the pivotal connection means for the rear ends of the beams 7 comprises an upstanding fulcrum bridge 15 susceptible of attachment in transverse straddling relation with the rear end portion of the tractor (see Figs. 5 and 8). The bridge 15 is of inverted U-shape and includes a cross beam 16 of hollow box-like cross section which may be formed by welding together as at 17 a pair of opposed channel members 18. Rigidly fixed at either end of the beam 16 are pairs of spaced apart, upstanding lugs 19 which serve as fulcrum supports for the rearward ends of the beams 7, the latter being attached to the lugs 19 as by means of detachable pivot pins 20. The upright side members of the fulcrum bridge 15 are also of hollow box-like form, being defined by channels 21 with flanges embracing the end portions of the cross beam 16 and being boxed in by closure strips 22. The upper end portions of the strips 22 are bent into underlying relation with the cross beam 16 and are rigidly secured thereto as by means of welding. At their lower ends, the members 21, 22 have apertured sleeves 23 fixed thereto for detachable pin connection with sleeves 24. The latter may, in turn, be welded or otherwise fixed to the ends of shallow channel bracket plates 25 adapted to be bolted down on flats 26 formed in the top of the rear axle casing 27 of the tractor. The cross beam 16 has fixed thereto, as by welding, a downwardly and forwardly projecting yoke 28 having pins 29 for detachable connection with an apertured plate 29A secured on top of the tractor casing (Fig. 5).

The fulcrum bridge 15 provides a relatively high pivotal axis for the beams 7 and this, together with the longitudinal curvature or droop of the beams, leaves space for rams of adequate length while allowing the front end portions of the beams to reach substantially to the ground. The high pivot axis also reduces the rearward component of movement of the front ends of the beams in attaining their position of maximum elevation, which position must remain ahead of the front of the tractor for load discharging purposes. Consequently, the front ends of the beams do not project unduly ahead of the tractor in intermediate positions of elevation, making the load receptacle travel vertically in an almost straight although arcuate path.

For the purpose of receiving the connecting pivot pins 20, the beams 7 are closed at their rearward ends by plug members 30 each having an apertured lug 31. Each such lug is adapted to fit between a corresponding pair of the upstanding fulcrum lugs 19 on the bridge 15 and may be provided with an appropriate sleeve or bushing which receives the pin 20 (Figs. 4, 5 and 8).

Figures 10, 11:
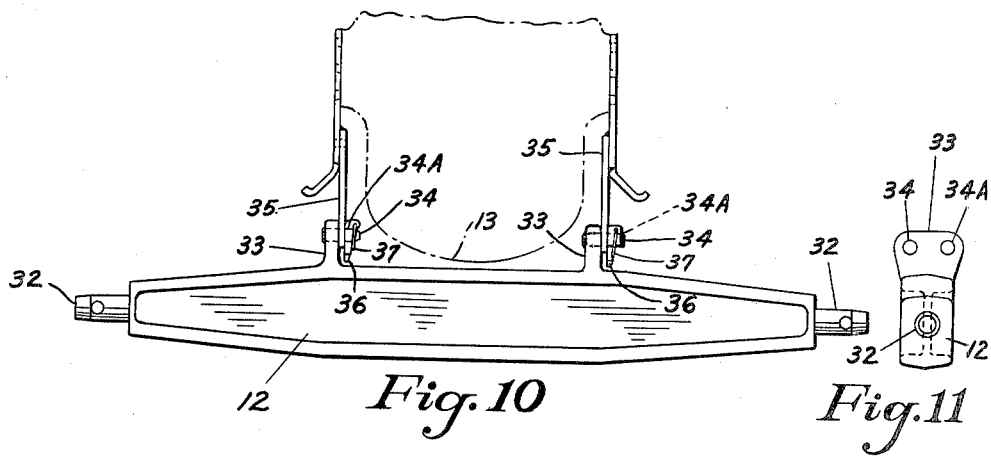
Fig. 10 is an enlarged elevational view of the transverse fulcrum bar and the means for attaching the same to the tractor.
Fig. 11 is an end elevational view of the device shown in Fig. 10.

Considering next the transverse fulcrum bar 12 which serves as the pivotal anchorage for the lower ends of the rams 11, reference will be had in particular to Figs. 10 and 11. The bar 12 may be fabricated as a forged beam having ends terminating in fixed pivot pins 32 for attachment of the lifting rams 11. Disposed in spaced apart relation on the top of the fulcrum bar 12 are a pair of upstanding lugs 33 each having two pins 34, 34A of unequal length. Fixed to the tractor body casing 13 and extending downwardly along the sides thereof are a pair of hanger plates 35 having suitably spaced holes therein for receiving the pins 34, 34A of the lugs 33. In the present instance, engagement between the fulcrum bar 12 and the hanger plates 35 may be effected by lifting up and then axially moving the bar 12, first to engage the longer pins 34, and then the shorter ones 34A. To secure the foregoing parts in position, the pins 34 are each adapted to receive a cotter pin 36 having a spring retaining ring 37 of a well-known type. The foregoing arrangement provides a readily attachable arrangement for the fulcrum bar 12 and when the latter is removed, the hanger plates 35 do not project below the belly of the casing 13 and thus do not reduce the ground clearance of the tractor. While the bar 12 has been shown with the pins 34, 34A projecting in the same direction, it might be noted at this point that the pins 34, 34A on both of the lugs 33 can be arranged to project inwardly. In such event, it would be necessary to spring one of the hanger plates 35 toward the other momentarily, to permit insertion of the pins 34, 34A.

For the purpose of connecting the upper ends of the main rams 11 to the boom structure of the attachment, each of the beams 7 has fixed at its region of greatest cross-sectional depth a pair of laterally spaced bracket plates 38. The plates 38 in each pair are shaped to nest snugly against the walls of their associated beam and are provided with outturned flanges 39 which are welded or otherwise rigidly fixed under the beam flanges 7D. The lower end portions of the plates are secured to each other, as well as to the beam, by means of an inverted U-shaped bracket 40. The lower end portions of each pair of the plates 38 and their bracket 40 are provided with alined apertures for receiving pins 41 which connect the respective movable members 10 of the rams with their corresponding plates 38 (see Figs. 2, 2A, 3 and 6).

As indicated earlier herein, the forward end of the boom structure is reinforced by the interconnecting frame 14. In the present instance, this frame comprises a bent or offset transverse member 42 having a cross section generally similar to that of the beams 7. Extending from the midportion of the member 42 and diverging forwardly are reinforcing members 43. The abutting portions of the members 42, 43 may be rigidly fixed together as by means of upper and lower plate members 44 which in this instance happen to be welded into place. In addition, the rearward ends of the plates 44 may be bent somewhat to follow the contour of the member 42. The extremities of the members 42, 43 may be rigidly secured to the beams 7 as by means of appropriate welds (see Fig. 7).

A wide variety of load receptacles may be provided for detachable mounting on the boom structure of the attachment described herein. In the present instance, the load receptacle happens to be a fork loader 45. The latter comprises forwardly extending fork tines 46 fixed in a cross tube 47 having suitably spaced pairs of mounting lugs 48 adapted for detachable pin connection with the lugs 49 extending from the front ends of the beams 7. An additional attaching means is provided for the tube 47 in the form of an inverted and substantially U-shaped bracket 50. The free ends of the bracket 50 are secured to the tube 47 while the upper end portion of the bracket is detachably connected by tie straps 51 to lugs 52 fixed on the upper one of the plates 44 (see Figs. 1, 2 and 9). Push-off means for discharging the load is provided in the form of a plate 53 having rearward struts 54 pivoted to the lower end of a swing lever 55. The upper end of the lever 55 is pivoted to the bracket 50, permitting the lever 55 to swing fore and aft in a generally vertical plane and at the same time reciprocate the plate 53 along the fork tines 46. The plate is formed with suitable holes along its lower edge for receiving the tines.

Power means for actuating the push-off plate 53 is utilized and includes an auxiliary ram 56 having one of its relatively movable members pivoted to upstanding lugs 57 on the plate 44 and its other movable member pivoted to an intermediate point 58 on the swing lever 55. By reason of such arrangement, the admission of pressure fluid to the auxiliary ram 56 will serve to shift the plate 53 longitudinally of the tines 46. In the event that the ram 56 should be of the single acting type, a pair of tension springs 59 may be interposed between the push-off plate 53 and anchor points on the beams 7 for returning the plate to its extreme rearward position.

Referring more specifically to Fig. 9, it will be noted that the auxiliary ram 56 may include a hollow T-shaped fitting 60 pivotally mounted between the lugs 57 and having an axial connection 61 with a pressure fluid supply conduit 62. The stem portion of the fitting 60 may be connected to the cylinder of the ram 56 by means of a self-sealing coupling 63, including a member 64 fixed to the member 60 and a member 65 fixed to the ram. The elements 64, 65, together with their detachable connecting means, constitute both a hydraulic and a mechanical connection which is capable of withstanding the mechanical loads resulting from actuation of the ram 56.

Pressure fluid for actuating the main lifting rams 11 and the push-off ram 56 is supplied from the hydraulic power lift unit on the tractor via a circuit selector valve 66. The latter is actuable by a handle 67 mounted conveniently alongside the tractor quadrant control handle 68 (Figs. 1 and 2). The valve 66 is connected through a jumper conduit 69 and a self-sealing coupling 70 with pressure fluid supply conduit 71 leading from the pressure side of the pump in the tractor hydraulic power unit. Flexible conduits 72 connect the valve 66 with the main rams 11, while the conduits 73, 62 connect the valve with the auxiliary or push-off ram 56.

The selector valve 66 may be of somewhat conventional construction, embodying a casing and rotatable plug with ports therein. The movable member of the valve is adjustable into three operative positions by means of the handle 67. In one such position, the movable member of the valve blocks communication between all the pressure fluid conduits and thereby holds all the rams in a fixed condition. In the second position, the valve connects the supply conduits 69, 71 with the conduits 72 of the main rams 11 and blocks the conduits 73, 62 leading to the push-off ram. Under this condition, the main rams 11 become extended and raise the boom structure of the attachment if the quadrant control handle 68 of the tractor is in the "lift" or oil-supplying position. Conversely, the rams 11 retract and lower the boom structure if the handle 68 is in the "drop" or oil-releasing position. In the final position of the movable member of the selector valve 66, the supply conduits 69, 71 are connected with the push-off ram conduits 73, 62 and the main ram conduits 72 are blocked. When this occurs, the ram 56 may be extended or retracted, respectively, by shifting the quadrant control lever 68 of the tractor into its oil-supplying (lift) position or into its oil-releasing (drop) position.

For many different types of loads, it will be found advisable to utilize a counterweight at the rear of the tractor to offset excessive forward overbalance of the tractor and the loader combined. For this purpose, a counterweight block 74 may be suspended from the cross bar 5 as by hooks 75 which project up from the top of the block (see Figs. 2 and 5).

Figure 13:
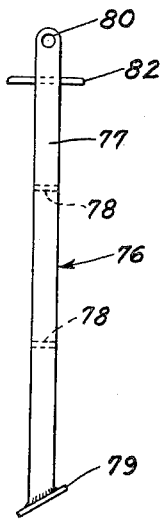

Turning now to Figs. 2, 12 and 13, it will be perceived that the loader may be equipped with ground support means to facilitate removal and attachment of the boom structure with respect to the tractor and the support members thereon. In the present instance, the ground support means comprises a pair of stands 76 each having divergent side legs 77 interconnected by rungs 78 (Figs. 12, 13) and an obliquely mounted foot plate 79. Adjacent their upper ends, the legs 77 of each stand have alined apertures 80 for detachable pin connection with apertures 81 in a corresponding one of the beams 7. A short distance below their upper ends, the legs 77 of each stand are spanned by a relatively wide plate 82 which serves as a stop flange and limits the extent of angular movement which the stand 76 can make relative to its associated beam 7.

The front end loader attachment described herein is readily and quickly attachable and detachable without the need for manhandling the main assembly or any relatively heavy parts. In detaching the loader, the first step is to detach the counterweight block 74 by the use of the hydraulic power lift of the tractor. The forward end of the loader should then be lowered to ground level and the tractor maneuvered so that the tines 46 are driven under the block 74. The detachable pins 20 connecting the rear ends of the beams 7 with the fulcrum bridge 15 may next be removed. The boom structure, including the beams 7, may thereupon be raised a slight amount by the main lifting rams 11 so as to occupy the position indicated in dot-dash outline in Fig. 2. This provides sufficient clearance for attachment of a stand 76 to each of the beams 7. The main lifting rams 11 are then allowed to retract and lower the boom structure, permitting the same to rest upon the stands. During such action, the stands 76 move angularly relative to their associated beams 7 until the stop flanges 82 accost the undersides of the beams, as indicated in solid outline in Figs. 2 and 2A. This locks each stand against angular movement with respect to its beam and precludes slipping along the ground and eventual collapsing. At this point, the selector valve 66 may be disconnected and the lower ends of the main lifting rams 11 may be detached from the extremities 32 of the fulcrum bar. The rams 11 may then be swung upwardly and extended to permit attachment of their lower ends to the respective beams 7 as by means of appropriate clip means (not shown). The tractor may thereupon be backed out from under the boom structure and the fulcrum bridge 15 and fulcrum bar 12 may subsequently be removed. Removal of all the foregoing members may be effected in a matter of minutes as distinguished from hours in the case of certain loaders in use heretofore. Since the attachment of each stand is to the rear of the center of gravity of the loader, the latter will rest with the rear end of the boom structure elevated. This is further insured due to engagement of the fork tines 46 under the counterweight block 74. The loader may, of course, readily be attached to the tractor by performing the foregoing steps in reverse order.

It will be appreciated by those skilled in the art that the loader attachment described above possesses a number of important structural advantages. Thus the side members 21, 22 of the fulcrum bridge effectively resist the tension stresses due to the load at the front of the boom structure. These members are also effective to resist bending loads due to their box-like cross section. In addition, the box-like cross beam 16 in the fulcrum bridge is also effective to resist torsion loads. This stiffness to bending and torsion of the fulcrum bridge 15 tends to preclude relative fore and aft movement between the beams 7 of the boom structure and which would result in undesirable side sway of the front end of the loader attachment.

We claim as our invention:

1. A front end loader attachment for a tractor having means for supplying pressure fluid, said loader attachment comprising, in combination, an upstanding fulcrum bridge susceptible of attachment in transverse straddling relation with the rear end portion of the tractor, anchor fittings for detachably but rigidly fixing said fulcrum bridge to the tractor, a pair of laterally spaced hollow beams pivotally attached to said fulcrum bridge for vertical swinging movement relative thereto and disposed in fore and aft relation with the tractor, each said beam being formed of channel pieces joined along the neutral axis and having an intermediate portion of a given cross-sectional depth tapering in opposite directions toward downwardly drooping end portions of relatively lesser depth, a connecting frame rigidly fixed to said beams, a load receptacle mounted on the forward ends of said beams, a transverse fulcrum bar disposable in closely nested relation with the underside of the tractor, means for detachably securing said fulcrum bar to the tractor in closely nested relation with the underside thereof, and a pair of hydraulic rams interposed between said fulcrum bar and the respective intermediate portions of said beams for power actuation of said attachment.

2. A front end loader for use on a tractor having a hydraulic power lift, said loader comprising the combination of an upstanding fulcrum bridge susceptible of attachment in transverse straddling relation with the rear end portion of the tractor, a boom structure smoothly curved along its longitudinal dimension and pivotally attached to said fulcrum bridge for vertical swinging movement relative thereto and disposed in fore and aft relation to the tractor, said boom structure having an intermediate portion with a hollow cross section of relatively greater depth than its end portions and tapering toward the same, a load receptacle mounted on the forward end of said boom structure, a transverse fulcrum bar disposable in closely nested relation with the underside of the tractor, means for detachably securing said fulcrum bar to the tractor in closely nested relation with the underside thereof, and means including a hydraulic ram interposed between said fulcrum bar and said intermediate portion of said boom structure for power elevation and lowering of said loader.

3. A front end loader attachment for a tractor having a hydraulic power lift, said loader comprising the combination of an upstanding fulcrum means disposable transversely of the rear end portion of the tractor, a rigid but downwardly drooped boom structure pivotally attached to said fulcrum means for vertical swinging movement relative thereto and projecting forwardly of the tractor, said boom structure including a pair of spaced, interconnected elongated hollow beams each formed of matched channel-like halves of relatively great depth at their mid-portions and tapering in depth toward their opposite ends, said channel-like halves being rigidly joined along the neutral axes of the respective beams, a load receptacle mounted on the forward end of said boom structure, a transverse fulcrum bar detachably connectible in closely nested relation under the tractor body housing, means for detachably securing said fulcrum bar to the tractor in closely nested relation under the body housing thereof, a pair of hydraulic rams interposed between said fulcrum bar and an intermediate portion of said boom structure for power elevation and lowering of said loader, and an auxiliary hydraulic ram mounted on said boom structure for discharging said load receptacle.

4. In a front end loader attachment for a tractor and having a forwardly extending boom structure, a fulcrum bridge member for the rear end of the boom and comprising a cross beam having means for pivotal connection with said boom, side members fixed to said cross beam and terminating at their lower ends in means for attachment to the rear of the tractor, a yoke fixed to said cross beam and projecting forwardly therefrom, said yoke being susceptible of detachable connection to the rear of the tractor, said cross beam and said side members being of hollow box-like cross section for maximum resistance to torsion and bending stresses.

5. In a load lifter attachment for a tractor having a body housing with a convex belly, a fulcrum bar having spaced apart upstanding lugs, a pair of hanger plates susceptible of attachment to said body housing in downward extending relation therewith but not projecting below the belly of the housing, said plates having pin receiving holes at their lower ends, and mounting pins fixed to the lugs of said fulcrum bar, said pins projecting horizontally from their lugs in one given direction and being spaced for engagement with the holes of said hanger plates upon axial movement of said fulcrum bar in said one given direction.

6. In a front end loader of the character set forth and adapted for use on a tractor having a hydraulic power lift, the combination comprising an arched boom structure, a load receptacle pivotally attached to said arched boom structure and adapted to rest upon the ground, ram attaching means located at an intermediate point on said boom structure, ram attaching means susceptible of attachment to the tractor, a ground support detachably and pivotally connectible with said boom structure at a point between said load engaging device and said ram attaching means, stop means on said ground support for limiting the pivotal movement thereof relative to said boom structure, and a hydraulic ram interposed between both said ram attaching means, said ram being adapted to raise said boom structure to permit attachment of said ground support, said ram also being adapted to lower said boom structure to allow the same to settle on said ground support.

7. In a front end loader of the character set forth and having a boom structure tending to be rearwardly overbalanced when removed from the tractor, a stand device comprising, in combination, an upright frame, means at the top of said frame for affording removable pivotal connection with the boom structure, stop means adjacent the top of said frame, said stop means being adapted to abut the underside of said boom structure to limit the swing of said stand about its pivotal connection with said boom structure so that said stand forms a rigid support when the rearwardly overbalanced weight of said boom structure is imposed thereon.

8. In a load lifter attachment for a tractor, the combination comprising a pair of laterally spaced hollow beams disposable in fore-and-aft relation with the tractor, each said beam tapering in depth from its intermediate portion toward its ends and comprising upper and lower continuous opposed channel pressings rigidly fixed together along abutting edges lying in the neutral axial plane of said beam, each said opposed channel pressing having throughout its length a radius of curvature flanked by straight sides which vary in depth to define the tapering depth of the beam, said beams having means at their rearward ends for pivotal connection at the rear of the tractor, a cross member connecting said beams, and means for pivotal connection of lifting means to intermediate points on said beams.

9. In a front end loader of the character set forth, a hollow longitudinal beam tapering in depth from its intermediate portion toward its ends, said beam comprising a pair of opposed channel members each having a cross section with a radius of curvature throughout the length of the beam flanked by straight sides which vary in depth to define the tapering depth of the beam, said channel members also having divergent sides terminating in outturned flanges welded together longitudinally of said beam.

References Cited in the file of this patent

UNITED STATES PATENTS

| Number | Name | Date |
|---|---|---|
| 2,019,938 | Stephens | Nov. 5, 1935 |
| 2,229,409 | Erickson | Jan. 21, 1941 |
| 2,393,435 | Wachter | Jan. 22, 1946 |
| 2,396,107 | Lessman | Mar. 5, 1946 |
| 2,417,560 | McNamara, Jr. | Mar. 18, 1947 |
| 2,418,403 | Grabske | Apr. 1, 1947 |
| 2,432,589 | Sauder | Dec. 16, 1947 |
| 2,449,279 | Conklin | Sept. 14, 1948 |
| 2,468,424 | Brauch | Apr. 26, 1949 |
| 2,472,278 | Brauch | June 7, 1949 |
| 2,485,110 | Pokorny | Oct. 18, 1949 |
| 2,501,797 | Ulrich | Mar. 28, 1950 |
| 2,517,582 | Lull | Aug. 8, 1950 |
| 2,520,451 | Baker | Aug. 29, 1950 |
| 2,537,010 | Andersen | Jan. 9, 1951 |
| 2,538,514 | Guignard | Jan. 16, 1951 |
| 2,542,150 | Luebbers | Feb. 20, 1951 |
| 2,613,006 | Bradford | Oct. 7, 1952 |